United States Patent
Chandra et al.

(10) Patent No.: US 11,153,535 B2
(45) Date of Patent: Oct. 19, 2021

(54) LOW-COST, LONG-TERM AERIAL IMAGERY

(71) Applicant: Microsoft Technology Licensing, LLC, Redmond, WA (US)

(72) Inventors: Ranveer Chandra, Kirkland, WA (US); Manohar Swaminathan, Bangalore (IN); Vasuki Narasimha Swamy, Berkeley, CA (US); Zerina Kapetanovic, Seattle, WA (US); Deepak Vasisht, Cambridge, MA (US); Akshit Kumar, Chennai (IN); Anirudh Badam, Issaqkuah, WA (US); Gireeja Ranade, Redmond, WA (US); Sudipta Sinha, Redmond, WA (US); Rohit Patil, Hubli (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/731,713

(22) Filed: Dec. 31, 2019

(65) Prior Publication Data

US 2020/0145621 A1    May 7, 2020

Related U.S. Application Data

(62) Division of application No. 15/414,033, filed on Jan. 24, 2017, now Pat. No. 10,560,666.

(Continued)

(51) Int. Cl.
*H04N 5/232* (2006.01)
*G06K 9/62* (2006.01)
(Continued)

(52) U.S. Cl.
CPC .............. *H04N 7/183* (2013.01); *B64B 1/50* (2013.01); *B64D 47/08* (2013.01); *G05D 1/00* (2013.01);
(Continued)

(58) Field of Classification Search
CPC .............. H04N 7/183; H04N 5/23222; H04N 5/23203; H04N 7/185; H04N 5/23206;
(Continued)

(56) References Cited

U.S. PATENT DOCUMENTS

2008/0060034 A1    3/2008   Egnal et al.
2015/0286868 A1*  10/2015   Flores ................ G06T 7/38
                                              382/103
(Continued)

FOREIGN PATENT DOCUMENTS

CN    103149788 A    6/2013
CN    105959576 A    9/2016

OTHER PUBLICATIONS

"First Office Action and Search Report Issued in Chinese Patent Application No. 201880007448.2", dated Apr. 15, 2021, 15 pages.

(Continued)

*Primary Examiner* — Shahbaz Nazrul

(57) ABSTRACT

An imaging system that includes a camera mounted on an aerial platform, for example a balloon, allows a user to increase the longevity of the camera's battery by remote control. A user may capture imagery at a time scale of interest and desired power consumption by adjusting parameters for image capture by the camera. A user may adjust a time to capture an image, a time to capture a video, or a number of cycles per time period to capture one or more images as the aerial platform moves in a region of interest to change power consumption for imaging. The system also provides imaging alignment to account for unwanted move- (Continued)

ment of the aerial platform when moved in the region of interest. Additionally, a mounting device is provided that is simple and inexpensive, and that allows a camera to remain positioned in a desired position relative to the ground.

14 Claims, 10 Drawing Sheets

Related U.S. Application Data

(60) Provisional application No. 62/449,049, filed on Jan. 22, 2017, provisional application No. 62/448,992, filed on Jan. 21, 2017.

(51) Int. Cl.
| | | |
|---|---|---|
| *H04N 7/18* | (2006.01) | |
| *G06K 9/00* | (2006.01) | |
| *G06K 9/32* | (2006.01) | |
| *B64B 1/50* | (2006.01) | |
| *B64D 47/08* | (2006.01) | |
| *G05D 1/00* | (2006.01) | |
| *G05D 1/02* | (2020.01) | |
| *G06T 7/11* | (2017.01) | |
| *G08C 17/02* | (2006.01) | |

(52) U.S. Cl.
CPC ............. *G05D 1/0094* (2013.01); *G05D 1/02* (2013.01); *G05D 1/0202* (2013.01); *G06K 9/0063* (2013.01); *G06K 9/3208* (2013.01); *G06K 9/6202* (2013.01); *G06T 7/11* (2017.01); *G08C 17/02* (2013.01); *H04N 5/23203* (2013.01); *H04N 5/23206* (2013.01); *H04N 5/23216* (2013.01); *H04N 5/23222* (2013.01); *H04N 5/23241* (2013.01); *H04N 5/23293* (2013.01); *H04N 7/185* (2013.01); *B64C 2201/022* (2013.01); *B64C 2201/148* (2013.01); *G06T 2207/10032* (2013.01); *G08C 2201/93* (2013.01)

(58) Field of Classification Search
CPC ........... H04N 5/23216; H04N 5/23241; H04N 5/23293; B64D 47/08; B64B 1/50; G06K 9/3208; G06K 9/6202; G06K 9/0063; G08C 2201/93; G08C 17/02; G06T 2207/10032; G06T 7/11; B64C 2201/148; B64C 2201/022; G05D 1/0202; G05D 1/02; G05D 1/00; G05D 1/0094
See application file for complete search history.

(56) References Cited

U.S. PATENT DOCUMENTS

| | | | | |
|---|---|---|---|---|
| 2017/0124709 | A1* | 5/2017 | Rithe | ................... G06K 9/2036 |
| 2018/0158199 | A1* | 6/2018 | Wang | ................... G06K 9/6211 |
| 2018/0237140 | A1* | 8/2018 | Li | ............................ G05D 1/10 |
| 2018/0328736 | A1* | 11/2018 | Ma | ....................... G06K 9/0063 |
| 2019/0354772 | A1* | 11/2019 | Tasli | ................. G06K 9/00798 |

OTHER PUBLICATIONS

"Extended European Search Report Issued in European Patent Application No. 20160133.3", dated Jun. 4, 2020, 8 pages.
"Search Report Issued in European Patent Application No. 21178203.2", dated Jul. 6, 2021, 7 Pages.

* cited by examiner

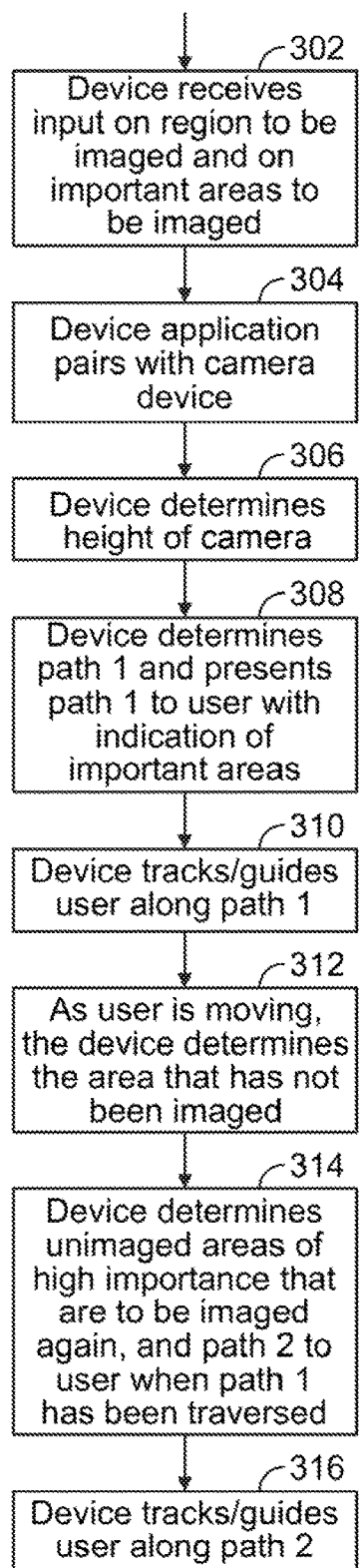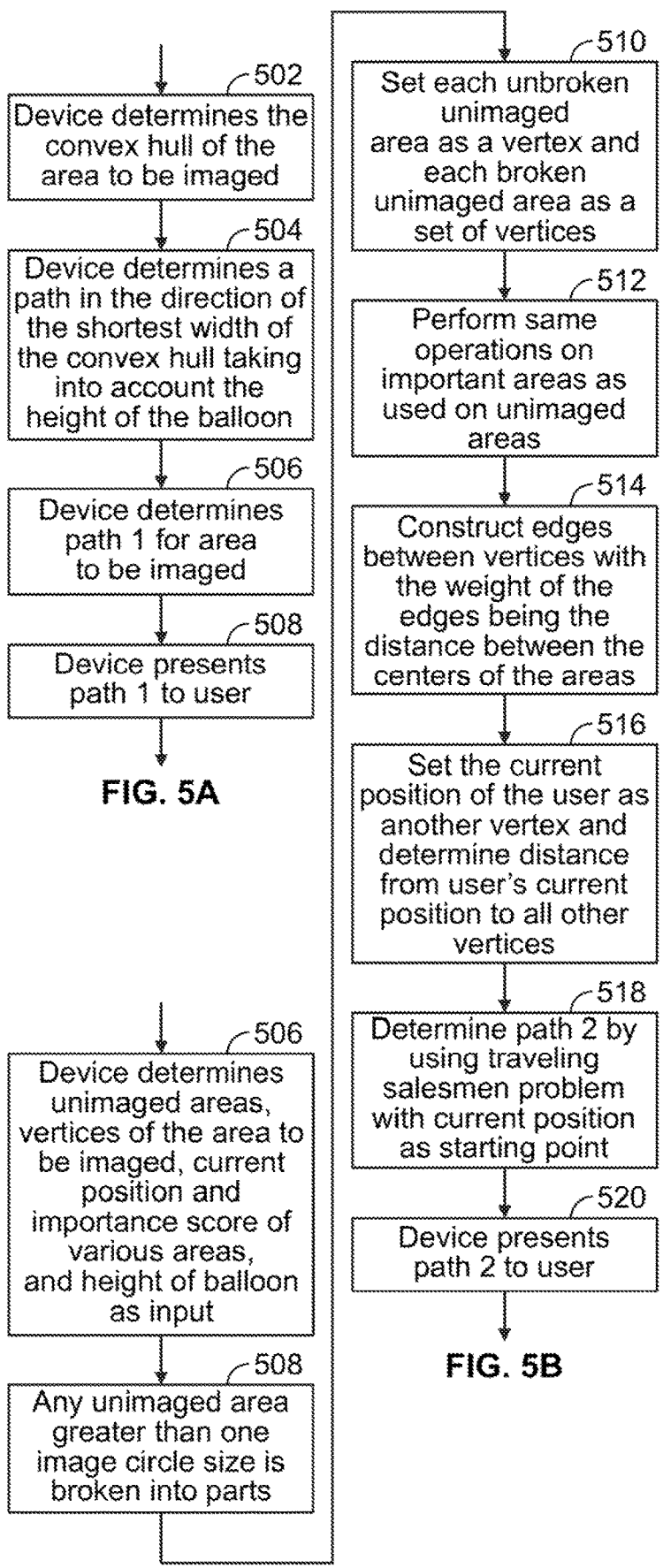
FIG. 3
FIG. 5A
FIG. 5B

LOW-COST, LONG-TERM AERIAL IMAGERY

CROSS REFERENCES TO RELATED APPLICATIONS

The present application claims priority to and the benefit of U.S. Provisional Patent Application No. 62/448,992 filed Jan. 21, 2017, and U.S. Provisional Patent Application No. 62/449,049 filed Jan. 22, 2017, the entire contents of which are hereby incorporated by reference.

BACKGROUND

High-resolution aerial imagery systems have become widely used over the last several years. This use has increased in both the research community and in industry. For example, visual imagery recorded using camera-equipped Unmanned Aerial Vehicles (UAVs) has been used for applications including disaster assessment, agricultural analytics and film-making Fueled by this increasing array of applications, UAV sales in US have tripled over the last year. In spite of recent advances in UAV technology, several factors severely limit the capabilities and adoption of UAVs. UAVs consume a large amount of power to stay aloft, resulting in very short battery life (on the order of a few tens of minutes for most commercial UAVs). This makes such UAVs infeasible for applications that require long-term continuous monitoring, like agricultural farm monitoring, surveillance and generating aerial time-lapse imagery. Also, the use of UAVs faces regulatory restrictions and the use of UAVs requires high capital investment. Mid-to-heavy payload carrying UAVs are expensive and typically cost over a thousand dollars. This cost factor is compounded by the fact that the UAV batteries have finite charge cycles and need to be replaced frequently if the UAV is used often.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments of the disclosure include apparatus and methods for use in an imaging system. The imaging system may be configured to include an aerial platform configured to rise to a height above ground. The aerial platform may be an apparatus such as a balloon or a kite. The aerial platform may include a steering apparatus that allows an entity on the ground to move the aerial platform in a desired direction when the aerial platform is suspended above ground. For example, the steering device may be a tether that allows the user/entity on the ground to control the height and position of the aerial platform. A camera device may be attached to the aerial platform and oriented in a direction to take images, including still images or videos, of the ground. The camera device may also include a position sensor such as a global poisoning satellite (GPS) device and a wireless interface for communicating with other devices. The imaging system may also include a mobile device that also has a wireless interface and that communicates with the camera device over the wireless interface. The mobile device may be a device such as a smart phone or tablet device and may have a user interface to receive input from, and provide output to, a user that may be the user/entity on the ground who controls the aerial platform using the steering device.

In operation, the mobile device may receive first data related to a region to be imaged by the camera device. The first data may be entered at the user interface by the user. The first data may include, for example, dimensional parameters of the region and at least one indication of an area of importance within the region. The mobile device may also receive second data that includes information related to a field of vision of the camera device. The second data may include, for example, data on the height of the aerial platform/camera device and/or image resolution data that may be input to the mobile device by the user or by some other method, such a being pre-stored or downloaded to the mobile device. Based at least on the first data and the second data, the mobile device may determine a first path within the region and provide information on the first path to the use/entity at the user interface.

The user/entity may then use the steering device to move the aerial platform with the user/entity as the user/entity moves along the first path according to the information on the first path received at the user interface. As the user/entity moves along the first path the mobile device receives third data from the position sensor of the camera device. The third data may include position data determined at the time of capture of each image or video frame of the region of interest by the camera device. Then, during and/or subsequent to the movement of the user/entity along the first path and based on at least on the third data, the mobile device may determine a second path within the region and provide information on the second path to the user/entity. The second path may be determined to account for at least one unimaged area of the region that remains unimaged in the traverse of the first path. The user/entity may then use the steering device to move the aerial platform along a traverse of the second path according to the information on the second path received at the user interface and capture additional images of the region. The first path may be constructed and/or adjusted in real time as the user moves along the first path with the aerial platform.

In an implementation, the imaging system includes a control device that includes an apparatus that allows a user to increase the longevity of camera battery life by duty cycling and/or controlling the camera device remotely so that only basic functionalities are running, except when other functions are needed. The user may use the apparatus to capture imagery at a time scale of interest by adjusting parameters related to image capture by the camera device. The implementation includes an apparatus that is configured to receive first data, the first data comprising information related to a region to be imaged and information related to a field of vision of a camera device positioned above a mobile entity on an aerial platform having a steering device, receive second data, the second data indicating a parameter related to power consumption by the camera device, and provide the second data to the camera device. The second data may include a time for the camera device to capture an image, a time for the camera device to capture a video, or a number of cycles per time period for the camera device to capture one or more images. The apparatus may then determine, based at least on the first data, path planning to provide to the mobile entity for imaging the region. The apparatus may comprise a mobile device including a user interface and the mobile device receives the second data indicating a parameter related to power consumption from the user interface in response to the mobile entity entering input at the user interface. The apparatus may also determine a battery life of the camera device based at least on the second data, and present an indication of the battery life to the mobile entity at the user interface. A user may then modify the time for the camera device to capture an image, the time for the camera device to capture a video, or the number of cycles per time period for the camera device according to the battery life and the time needed to image a particular region.

In an further implementation, the imaging system includes a control device including an apparatus that is configured to receive a plurality of images from a camera device, extract a plurality of features from the plurality of images, reject selected features of the plurality of features that do not match across the plurality of images, determine a homography that maps features in each image of the plurality of images to features in another image of the plurality of images, and apply the homography to a current image captured from the camera device and ensure that the current image is aligned to an image previous to the current image. This image alignment allows the use of an aerial platform that is less expensive, but may be susceptible to translations and rotations in the air to that cause unwanted motion of the camera device due to the impact of wind on the aerial platform.

In a further implementation, the imaging system may include an aerial platform configured to rise to a height above ground. The aerial platform may include a balloon and a steering apparatus that allows an entity on the ground to move the aerial platform in a desired direction when the aerial platform is above ground. The imaging system may further include a mount including a member having a long axis, a first end, and a second end, the mount further includes a swiveling apparatus that couples the first end of the member to the aerial platform, wherein the member to hangs substantially perpendicular along its long axis to the ground from the aerial platform. The mount also includes a case having a first portion and a second portion. The first portion of the case is coupled to the second end of the elongated member. The case is configured to receive a camera device and hold the camera device so that focal plane of the camera device is perpendicular to the long axis of the member.

BRIEF DESCRIPTION OF THE DRAWINGS

FIG. 3 is a flow diagram illustrating example operations of an implementation for imaging a region of interest;

FIG. 5A is a flow diagram illustrating example operations for determining an initial path to follow when imaging a region of interest;

FIG. 5B is a flow diagram illustrating example operations for determining a subsequent path to follow for imaging unimaged areas for a region of interest;

DETAILED DESCRIPTION

Figure 1A:
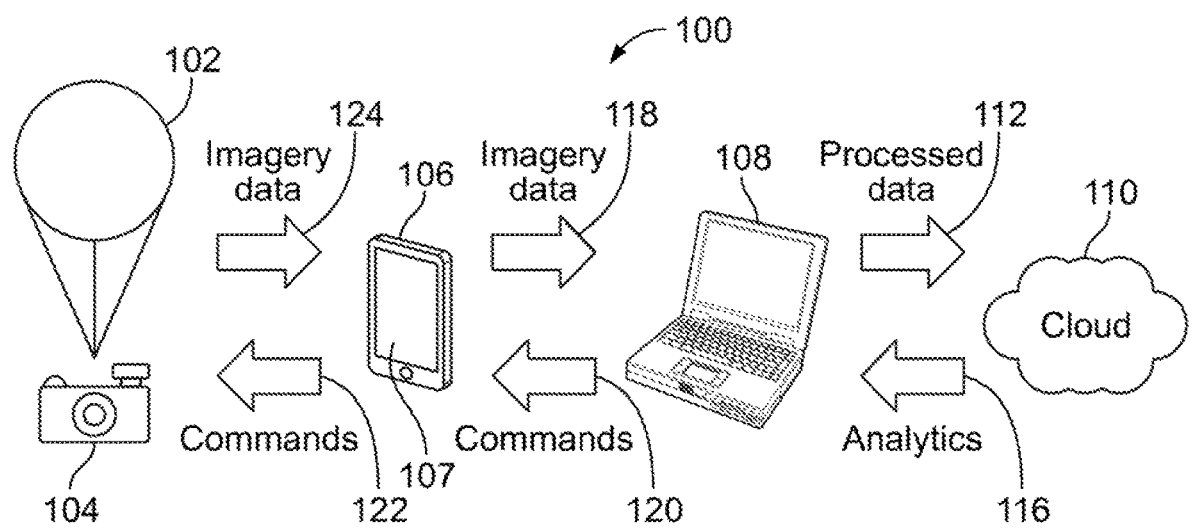
FIG. 1A is an illustration of an example system.

The system and method will now be described by use of example embodiments. The example embodiments are presented in this disclosure for illustrative purposes, and not intended to be restrictive or limiting on the scope of the disclosure or the claims presented herein.

The disclosed embodiments include apparatus, devices, and methods for use in a system for large-scale high-resolution aerial photography of a region of interest. The apparatus, devices, and methods provide a practical and low-cost alternative to aerial imaging based on the use of unmanned powered aerial vehicles such as quadcopters and fixed wing drones in situations when the use of these types of aerial vehicles is infeasible due to limited battery life, cost, and/or regulatory restrictions. The embodiments also provide advantages over aerial imaging based on the use of satellites or airplanes, which can be expensive and not flexible enough for many users.

In an example implementation, the system may include a camera device attached to an aerial platform, such as a tethered helium balloon, using a mounting device and a mobile device. The aerial platform may either remain anchored to a stationary ground point or an on ground anchor over an extended period of time or be physically attached to, and moved/guided by, a user/entity, such as person or a vehicle along a path within the region of interest. The mobile device may be utilized to receive control input from a user/entity and provide guidance information to the user/entity related to movement along the path within the region of interest. In other implementations, any other type of aerial platform that may be tethered or attached to a moving entity may be used. For example, a kite may be used as the aerial platform.

Use of the embodiments optimizes coverage of a target area for imaging in a region of interest in spite of variations in the position of the camera device and aerial platform with respect to an anchor or tether point. The embodiments allow a user to acquire high quality aerial imagery over extended areas of a region, or over long stretches of time, while keeping the total cost of such acquisition much lower than when using powered aerial vehicles. For example, implementations have application in agricultural farm monitoring, flood analysis and crowd monitoring. These applications conventionally require expensive infrastructure (such as camera towers or human operated blimps) to be cost effective and feasible.

The embodiments provide advantages over other conventional techniques such as use of UAVs, satellites and cameras attached to airplanes. For example, much satellite imagery data is available at no cost but the imagery data has shortcomings. Commonly available satellite imaging resolution is poor. The best resolution is on the order of 46 cm per pixel. Also, image data collected from satellites is severely affected by cloud cover and, hence, not suitable for many applications. Additionally, satellite images are usually old when obtained since most satellites have a turnaround period on the order of days. Even though better images that provide good resolution may be obtained through private commercial satellite systems, these commercial images are very expensive. These commercial images normally have a minimum order requirement and cost thousands of dollars. The aforementioned factors make satellite imagery unsuitable for many applications and especially the small scale ones. Airplane cameras provide better resolution images than satellites, but suffer from similar disadvantages as they are also very expensive.

Also, although advancements in UAV research have created a range of drone types for various uses, drones also have many disadvantages. A mid to heavy payload carrying drone may cost thousands of dollars. Thus the capital investment cost of using drones may be high. Also UAVs have limited battery life which mandates a limited flight time and a UAV needs to be charged regularly for continuous image capture. If a UAV's batteries undergo several cycles of charging/discharging, then battery longevity is reduced and the batteries would need to be replaced. Thus drones don't just incur an initial capital cost but also a moderately high operational cost. One big disadvantage of using UAVs comes in the form of regulations which restrict how, where and when UAVs may be used.

The embodiments of this disclosure provide low-cost alternatives to the above discussed methods of aerial imaging. The embodiments provide systems having longevity. Once the system is up and running, it should last for a long enough time without the need for human intervention. The embodiments also provide systems that allow as low a cost of the system as possible. This making it economical for persons in developing countries to easily use the system and its new technologies. Also the aerial platform based imaging of the embodiments is flexible and programmable. A user is able to choose the area of interest, the quality of the imagery, the duty cycling etc., flexibly, as per need. A user is also able to make adjustments of battery life for given applications by remotely changing parameters of the camera device related to power consumption. For example, a user may adjust a length of time for capture of a still image, a length of time for capture of a video, or a number of cycles per a time period for taking one or more images in order to adjust power consumption in view of available battery power.

The embodiments utilize an aerial platform such as a tethered balloon to be used as a low-cost drone to carry a camera device. Such an aerial platform is low cost and may be shared across many users. For example, in an agriculture application a group of farmers interested in documenting crop growth could share a single imaging system. The imaging system may be made mobile by tethering the system to a moving vehicle instead of a stationary point on the ground. Usually, an aerial imaging system with an unstable camera is not preferred for creating panoramic views of an area of interest. However, the embodiments use techniques and methods that account for wind motion by flexibly mounting the camera device to the aerial platform to allow the camera device to remain substantially parallel to the ground, and also correct for wind motion by stabilizing the camera and using a pre-planned path to capture aerial imagery. Also, the pre-planned path includes two-step path determination that accounts for wind disturbances mid-way through the imaging. In addition, implementations of the embodiments utilize image matching techniques that extract a plurality of features from the plurality of images, reject selected features of the plurality of features that do not match across the plurality of images, and determine a homography that allows a current image to be aligned to a previous image. This also helps in accounting for wind motion and the susceptibility of the aerial platform to translations and rotations in the air due to the impact of wind.

FIG. 1A is an illustration of an example aerial imaging system. FIG. 1 shows a system 100 that includes aerial platform 102 (shown as example balloon 102), camera device 104, ground communication device (GCD) 106 (shown as example mobile device 106 having user interface touch screen 107), gateway node 108, and cloud network 110. In implementations, system 100 may be configured to be operable in two modes, stationary mode or mobile mode.

Stationary mode of operation is suitable for applications where the region of interest for imaging remains constant and changes in the area are to be tracked regularly for a long period of time. In this mode, the level of human intervention is minimal. For example, this mode may be used for imaging crop growth or flooding at a useful time granularity. For example, the aerial balloon 102 may be tethered to a single stationary point on the ground for an extended period of time (days to weeks). The balloon 102 may be a reusable helium filled balloon with a payload which consists of camera device 104 which is programmable and has its own power source. The camera device 104 may be pointed towards the object of interest which in this case is the ground plane of the area of interest.

The GCD 106 may perform two functions. The first function is to upload the imagery 124 to the gateway node 108 which has connectivity to the internet using an appropriate wireless technology having channels configured according to a Wi-Fi standard, or configured to operate using channels in the TV white spaces (TVWS). The second function is to enable duty cycling of the camera device 104. The GCD 106 may be programmed to turn on the camera device 104 remotely, trigger the camera device 104 to capture imagery, transfer the imagery to the interface and power off the camera device 104—essentially acting as a remote controller by sending commands 122 to camera device 104.

The gateway node 108 may also perform two functions. First, gateway node 108 functions as a node with computational capabilities not provided by camera device 104 or GCD 106. The gateway node 108 may execute initial vision based post-processing on the imaging data 118 that is being sent from the GCD 106. Second, the gateway node 106 may act as a gateway to upload data 112 to the cloud network 110 where further applications could run on the imaging data and provide the user with further processed data 116. In one implementation, the local processing performed by GCD 106 may be used to conserve bandwidth (as videos can be very large) as well as to maintain system robustness during any cloud connectivity outages. In this implementation, long-term analytics may be run on the cloud network 110 and the gateway node 108 may processes the immediately data and presents the farmer with immediate short term analytics 120. In an alternative implementation, the GCD 108 may directly upload the videos to the cloud network 110 without using the gateway node 108. Then, instead of accessing imaging data locally, a user may access the imaging data directly from the cloud network 110. In other example implementations, multiple cameras may be strategically placed to ensure coverage. For example, multiple cameras may be used when height regulations and/or the camera's field-of-view (FOV) limits the area imaged by a single camera device.

Mobile mode of operation may be used where the region of interest for imaging is larger than what can be achieved using a stationary camera and when the granularity at which updated imagery data is needed is appropriate for use of mobile mode. For example, if a large region is to be mapped once a day, mobile mode may be used. Mobile mode may also provide an advantage if a community or group of users want to share resources (say for example a farming community in a developing country).

Figure 1B:
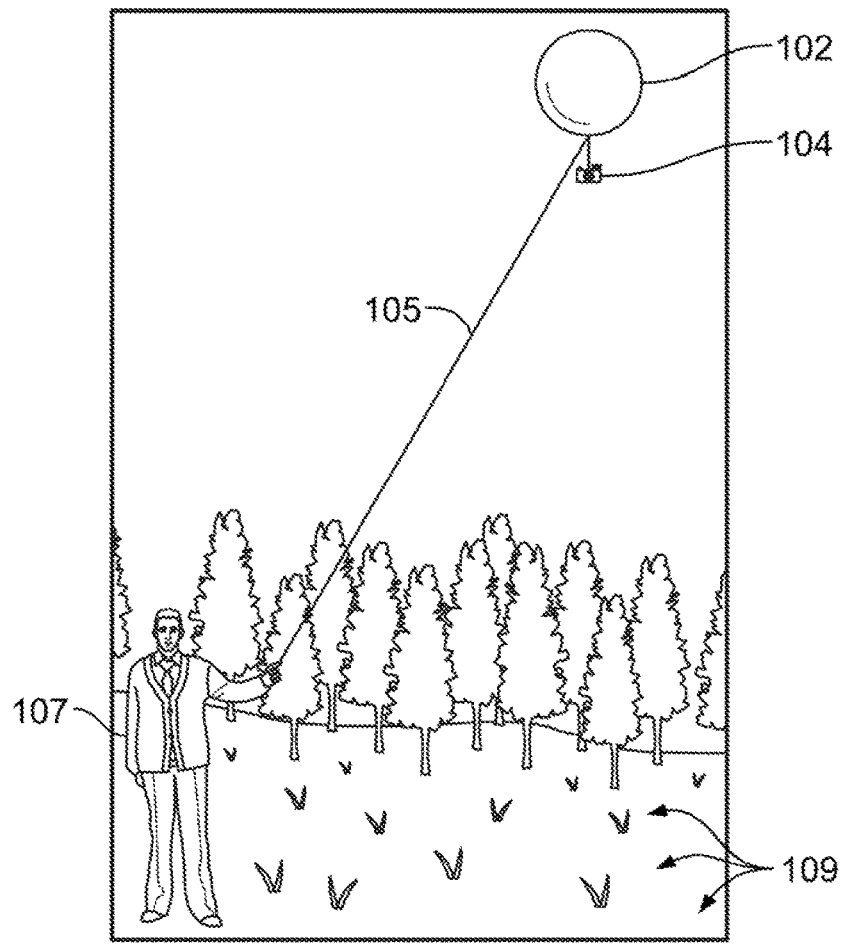
FIG. 1B is an illustration of use of an example system in mobile mode.

FIG. 1B is an illustration of use of an example system in mobile mode. FIG. 1 shows the balloon 102 of system 100 connected by tether 105 to user 107. Balloon 102 and tether 105 may be configured to allow balloon 102 to rise to a desired height above ground. For example the length of tether 105 and the amount of gas, such as helium, in balloon 102 may be set to cause balloon 102 to float at a desired height. Camera device 104 is mounted below balloon 102 and is positioned to point at region of interest 109 on the ground. In other uses the balloon may be tethered to any type of mobile point, for example tethered to a vehicle such as a bicycle or an automated vehicle. User 107 may manipulate tether 105 to move balloon 102 and camera device 104 to obtain images of a region of interest. In mobile mode, the GCD 108 runs an application that provides guidance information (path planning) to a user/entity about how to cover the area of interest efficiently in addition to serving as an interface between the camera device 104 and the gateway node 108 and as a remote controller for the camera device 104.

In an example implementation, the system 100 utilizes a path planning function configured in GCD 108. The path planning function is configured to first determine and efficiently utilize the area captured by images or video taken from camera device 104 for a current system configuration.

Figure 2A:
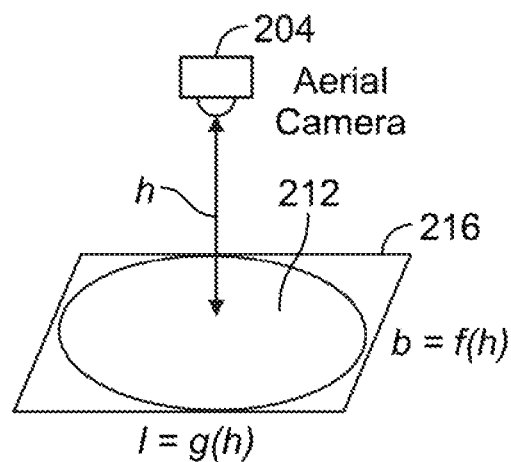
FIG. 2A is a diagram illustrating an example imaging area of a camera device.
Figure 2B:
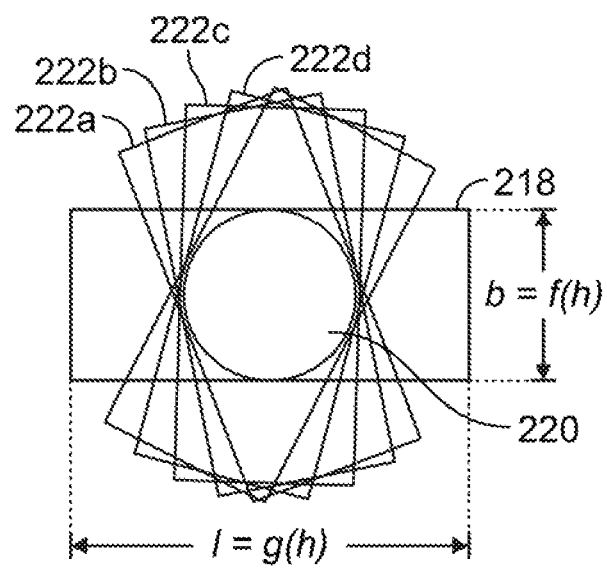
FIG. 2B is a diagram illustrating example operations for determining imaging areas of a camera device.

FIG. 2A is a diagram illustrating an example imaging area of camera device 104 of system 100, and FIG. 2B is a diagram illustrating example of determining imaging areas of a camera device. Referring to FIG. 2A, the image captured in every frame/image from camera device 104 may be represented as a circle 212. Consider a camera with a vertical field-of-view (FOV) of θ and horizontal FOV of φ which are angles along edges b and l, respectively, of area 216. When the balloon 102 is currently stationary and flying at a height h as shown in FIG. 2A, the horizontal length l covered by an image is then given by.

$$l = g(h) = 2*h*\tan\left(\frac{\theta}{2}\right)$$

and the vertical length b covered is given by $$b = f(h) = 2*h*\tan\left(\frac{\theta}{2}\right)$$

The aerial platform/balloon 102 for mounting the camera device 104 may be designed in such a way that the camera faces the ground with maximum/high probability. However, there is a rotatory motion about the axis normal to the ground (in the plane parallel to the ground). If the balloon 102 is currently stationary and wind doesn't shift the tethered balloon, it is still difficult to exactly estimate what area is getting imaged because of the local rotation at the pivot where camera device 104 is attached to the balloon.

Referring to FIG. 2B, to account for this rotation, the imaged area may be lower bounded by rotating the rectangle pivoted at the centroid to account for the various orientations of the camera may be as shown in FIG. 2B by the rotations shown by rectangles 22a-22d. The intersection of these rotated rectangles may be is then taken to provide an inner circle 220 of the rectangle with radius:

$$r = \frac{1}{2}\min(b, l) = \frac{1}{2}\min f(h), g(h)$$

As the radius of the circle is a function of the height of the balloon 102 and the FOV of the camera (which may remain static during a single imaging session of a region of interest), the area imaged by the camera can be lower-bounded by the circle of the appropriate radius.

Figure 2C:
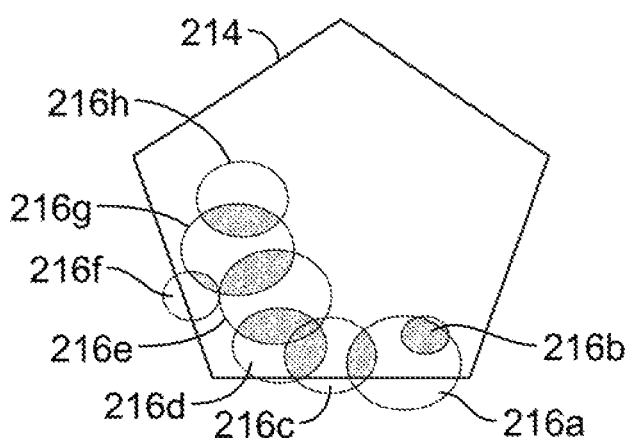
FIG. 2C is a diagram illustrating example imaging areas of a camera device within a region of interest.

Referring to FIG. 2C, therein is a diagram illustrating example imaging of a camera device within a region of interest. FIG. 2C shows areas 216a-216h which vary. For example as the height of the balloon 102 in FIG. 2A varies, the radius of the FOV varies as well. As the person or vehicle moves, and camera device 104 takes images of the area, which may be displayed to the user at GCD 107, while taking the movement induced by wind (as well as human movement) into account. A user may then visualize the area that is not imaged and make appropriate decisions. When imaging only a small fraction of a total area of interest, a user may adjust the height of balloon 102 in order to maximize the probability of a desired coverage.

FIG. 3 is a flow diagram illustrating example operations of an implementation for imaging a region of interest. The process of FIG. 3 may be used in an implementation of mobile mode of system 100 of FIG. 1 for imaging the region of interest. In the process, a first path is presented at CGD 106, which may be a mobile device, for a user to follow in the region of interest, such that in ideal conditions this path would be the path that minimizes the time taken to image the area. After the first path is traversed, depending on the amount of area covered (taking wind into consideration), another second minimal time-consuming path to be followed to cover the remaining area is presented at CGD 106. The use of the second path compensates for wind related uncertainty midway through the imaging process.

Figure 4B:
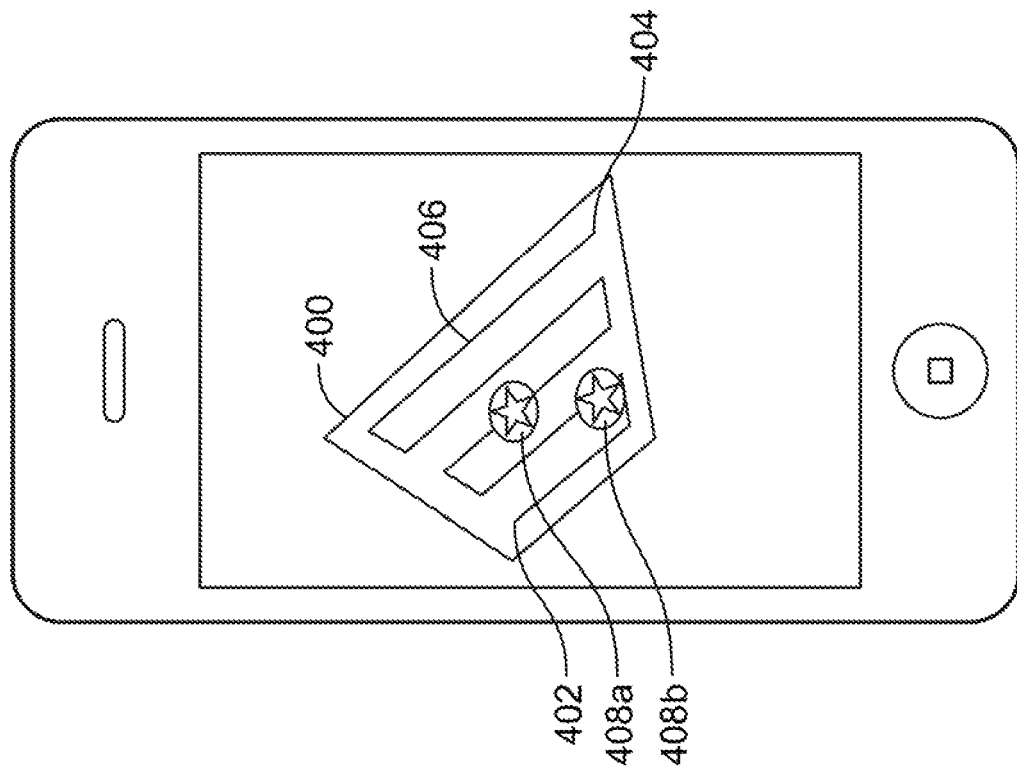
FIG. 4B is a diagram illustrating an example initial path for a imaging a region of interest.
Figure 4A:
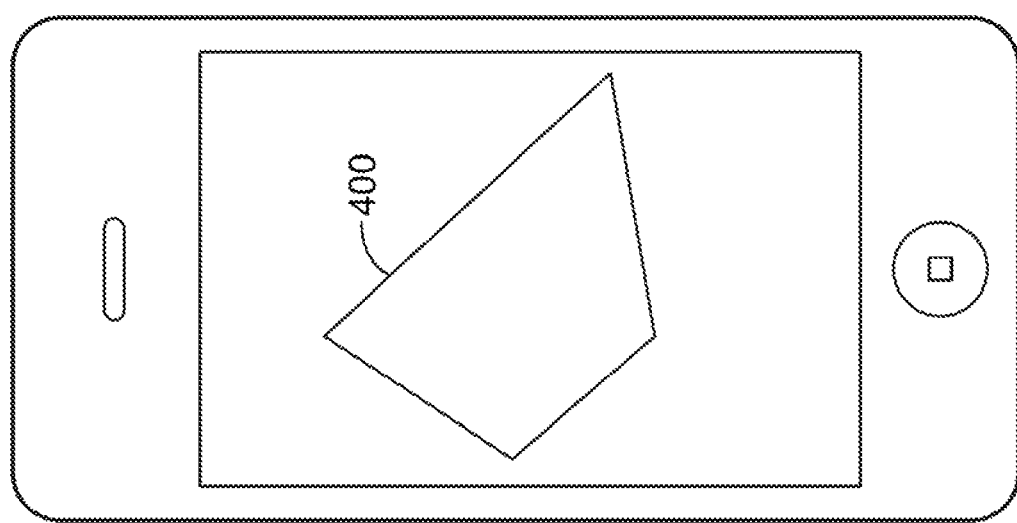
FIG. 4A is a diagram illustrating an example region of interest.

The operations of FIG. 3 may be performed at CGD 106 as it interacts with a system user through a user interface, such as a touchscreen display, and interacts with camera device 104 through a connecting wireless interface, such as a Wi-Fi or Wi-Fi Direct interface. The process begins at 302 where CGD 106 receives input comprising information related to a region of interest to be imaged including information on important areas in the region of interest for imaging. The user of GCD 106 may input the information to GCD 106 through a touchscreen on GCD 106, such as touchscreen 107 shown on GCD 106 in FIG. 1. Entering the input may include, for example, entering GPS coordinates related to the region of interest. In other examples, the entering of the input may include indicating areas of a map displayed on touch screen 107 by touch input/drawing in response to appropriate prompts from GCD 106. The input may also be downloaded from another device or from a database. FIG. 4A is a diagram illustrating an example region of interest 400 as it may appear on the display 107 of GCD 106 in an implementation.

At 304, GCD 106 then pairs with camera device 104 through their connecting wireless interface. At 306, GCD 106 determines the height of the balloon/camera device 104. The height of the camera device may be received as input from the user. At 306, CGD 106 may also receive information on an image resolution to be used for camera device 104. CGD 106 may then determine the FOV of camera device 104 for the imaging of the region of interest.

At 308, GCD 106 determines path 1 and presents path 1 to the user along with an indication of important areas of the region of interest at user interface 107. FIG. 4B is a diagram illustrating an example path 1 for imaging a region of interest as it may appear on the display 107 of GCD 106. FIG. 4B shows region of interest 400, areas of importance 408a and 408b, and path 1 406 having beginning 402 and end 404. It can be seen that path 1 goes through areas of importance 408a and 408b.

At 310, GCD 106 tracks and/or guides the user through user interface 107 to stay on path 1 as the user traverses the path 1 presented to the user. At 312, GCD 106 tracks areas that have not been imaged as the user traverses path 1. GCD 106 may receive data associated with the position of the camera device as the user traverses the first path. For example, GCD 106 may receive GPS data from camera device 104 to allow GCD 106 to determine the position of camera device 104 and the user. Also, GCD 106 may display an indication of the user's position to help guide the user to traverse the path from beginning 402 to end 404.

Figure 4D:
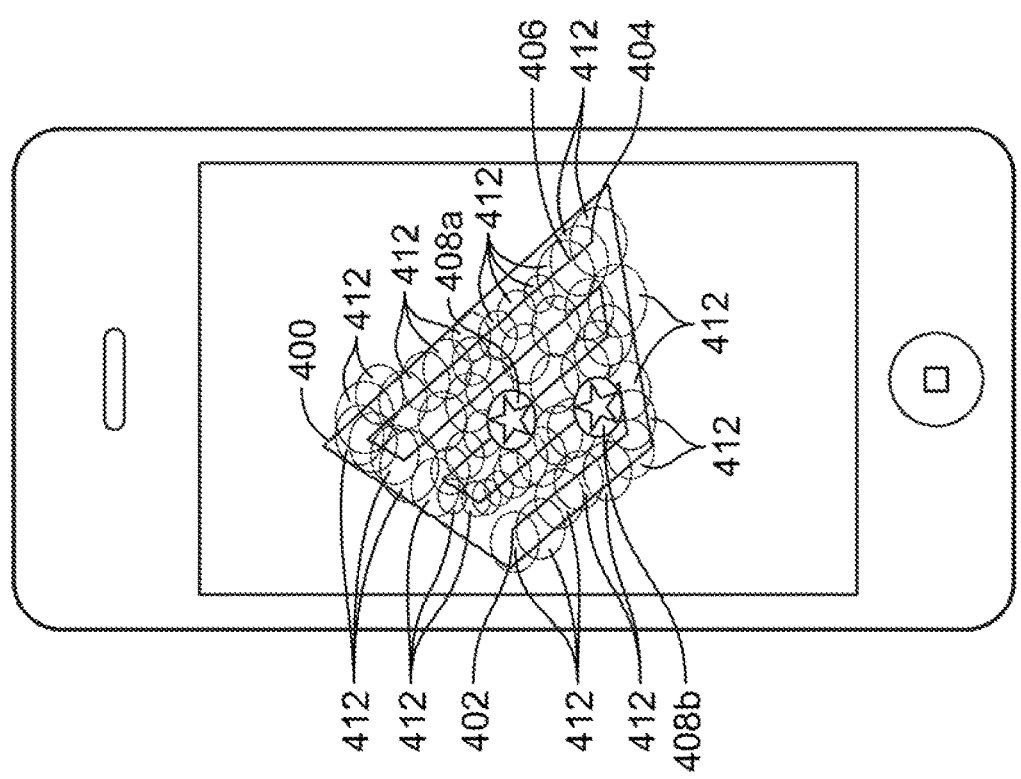
FIG. 4D is a diagram illustrating an example of an area imaged when the initial path for a region of interest is fully traversed.
Figure 4C:
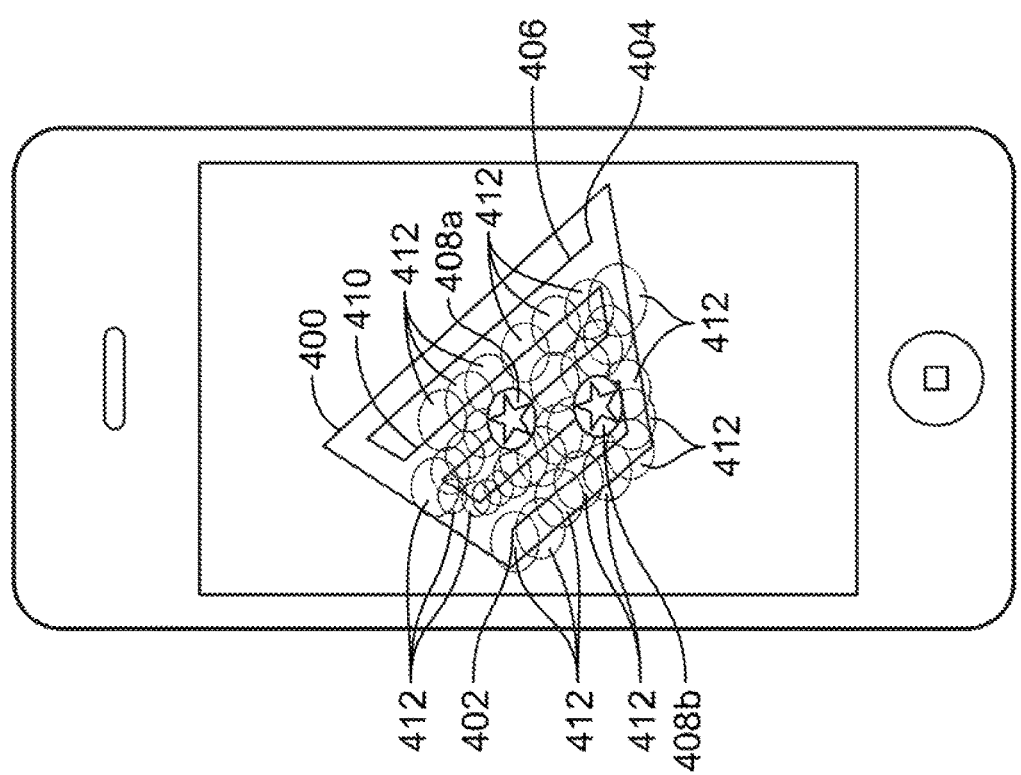
FIG. 4C is a diagram illustrating an example of an area imaged when the initial path for a region of interest is partially traversed.

As the user traverses path 1, the user may move the balloon 102 and camera device 104 along path 1 above the user so that the camera device takes images along the path 1. FIG. 4C is a diagram illustrating an example of an areas imaged when the initial path for a region of interest is partially traversed by a user to a current position on path 1. FIG. 4C shows the imaged area as circles 412 along path 1 406 between starting point 402 and current position 410 FIG. 4D is a diagram illustrating an example of areas imaged when the initial path for a region of interest is fully traversed. FIG. 4D shows the imaged areas as circles 412 along path 1 406 between starting point 402 and end point 404. It can be seen in FIGS. 4C and 4D that the areas of importance 408a and 408b are fully imaged. FIGS. 4C and 4D may be displayed to the user of GD 106 to aid the user in traversing path 1. In an implementation, path 1 may be re-determined and/or adjusted in real time as the user moves along path 1 with the aerial platform. For example, if the user deviates from path 1, path 1 may be re-determined/adjusted in real time to account for the deviation. In an implementation, a gyro in camera device 104 may transmit gyro readings to GCD 106 as camera device 104 swings and pivots around various axis during traversal of the path 1 by a user. The gyro readings may be associated with each image, or each frame of a video taken. The gyro readings may be used for path planning when determining areas that remain unimaged and need to be imaged again. The gyro readings may indicate the images/times when the camera was tilted away from the ground plane. Then, based on the gyro readings, frames/images captured by the camera when it was tilted beyond an acceptable range may be discarded. The range of acceptable gyro readings may be a parameter that is input to the system. For example, a user may input the acceptable range of gyro readings into GCD 106 as part of the data entered at operation 302. A larger range of gyro values can add width to the area considered covered with the traversal of path 1. A smaller range might create a narrower path 1 that is considered covered. This may be used to discard images that may not be useful for a particular imaging accuracy desired by a user.

Figure 4F:
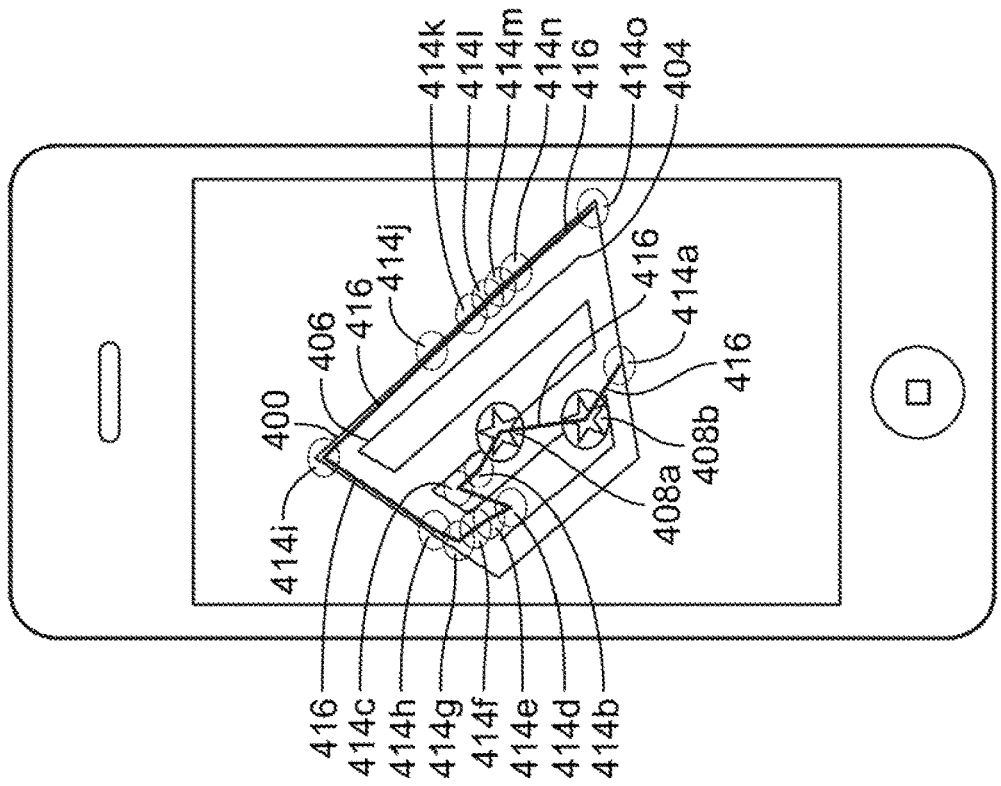
FIG. 4F is a diagram illustrating an example subsequent path for imaging unimaged areas when an initial path for a region of interest has been fully traversed.
Figure 4E:
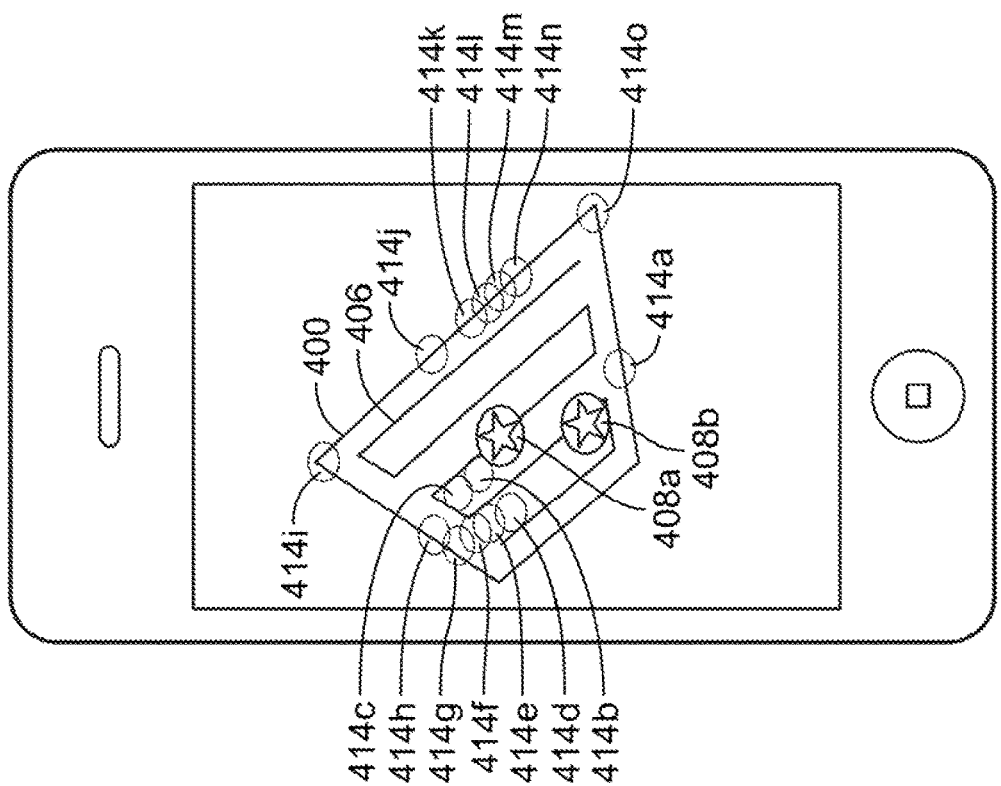
FIG. 4E is a diagram illustrating an example of unimaged areas when the initial path for a region of interest is fully traversed.

At 314, when the path 1 has been traversed, GCD 106 determines the areas that have not been imaged, areas of high importance that are to be imaged, and a path 2. FIG. 4E is a diagram illustrating an example of unimaged areas when the initial path for a region of interest is fully traversed. FIG. 4E shows the unimaged areas as circles 414a—414o. FIG. 4F is a diagram illustrating an example subsequent path 2 for imaging unimaged areas when an initial path 1 for a region of interest has been fully traversed. FIG. 4F shows path 416 that has been determined to go through unimaged areas 414a—414o, with a starting point in unimaged area 414a and an ending point in unimaged area 414o.

Path 2 is then presented to the user with an indication of important unimaged areas of the region of interest at user interface 107. At 316, GCD 106 tracks and/or guides the user through user interface 107, to stay on path 2 as the user traverses the path 2 presented to the user. GCD 106 may guide the user along path 2 in the same manner as it guided the user along path 1. As the user traverses the path 2, the user moves the balloon 102 and camera device 104 along the path 2 above the user and ground so that the camera device takes images along the path 2.

In the implementation, GCD 106 determines the first path to image the region at 308 assuming that there are no random effects associated with wind. Wind has both positive and negative effects. Wind causes camera motion which causes a larger area to be imaged than was intended. However, this also means it might be difficult to image intended areas due to the direction or intensity of wind flow. However, GCD 106 ignores the effect of wind on the balloon path and outputs a deterministic path which minimizes the time taken to image an area.

FIG. 5A is a flow diagram illustrating example operations for determining an initial path to follow when imaging a region of interest. In an implementation, the operations of FIG. 5A may be performed by GCD 106 at operation 308 of FIG. 3.

The process begins at 502 where GCD 106 determines the convex hull of the region to be imaged. Next, at 504, GCD 106 determines a path in the direction of the shortest 'width' of the convex hull taking into account the height of the balloon. For example, if a straight line of length 1 is traversed by the user, then the area imaged is of size l×w, where w is the width of each image. GCD 106 determines coverage of the convex polygon with ribbons of width w such that the length of the ribbon plus the number of ribbon stripes used to cover the area is minimized Laying ribbons out in any direction can potentially incur some wastage on the edges. If GCD 106 ignores those areas, the area covered by any layout is the same. Thus, the length of ribbon used (which is equal to area divided by w) is also the same. The different layouts to cover the area then only differ by the number of stripes. GCD 106 minimizes the number of stripes by laying them down along the smallest 'width' of the convex polygon. The smallest 'width' of the polygon is defined as the smallest edge of all the rectangles which cover the given polygon. Then, at 506, GCD 106 determines path 1 for the region of interest, and, at 508, presents path 1 to the user of GCD 106.

GCD 106 determines the path 2 using the information obtained from the camera device 104 during the traverse of path 1. Path 2 is determined to provide coverage of areas that remain unimaged after path 1 is traversed by the user with the balloon 102 and camera device 104.

FIG. 5B is a flow diagram illustrating example operations for determining a subsequent path to follow for imaging unimaged areas for a region of interest. In an implementation, the operations of FIG. 5B may be performed by GCD 106 at operation 314 of FIG. 3. The process begins at 506 where GCD 106 determines the unimaged areas of the region of interest, the vertices of the areas to be imaged, the current position of the camera device 104, the important areas of the region, and the height of the camera device 104. At 508, GCD 106 breaks any unimaged areas greater than one image circle size into parts equal to or less than one image size. At 510, GCD 106 sets any unbroken unimaged area as a vertex and each broken unimaged area as a set of vertices defined by the parts of the broken area. At 512, GCD 106 performs the same operation performed in 514 on the important areas of the region of interest. Next, at 514, GCD 106 constructs edges between the vertices created in operations 514 and 516 with the weight of the edges being the distance between the vertices.

At 516, GCD 106 determines the user's current position and sets the user's current position as a vertex. The distance from the user's position to all the other vertices is then determined. Then, at 518, GCD 106 determines path 2 using, for example, the traveling salesman solution with the user's current position as the starting point. At 520, GCD 106 then presents path 2 to the user.

In the implementation of FIG. 3 and FIGS. 5A and 5B, at the end of the process, some small pockets of the area might still remain unimaged. However, in both iterations using path 1 and path 2, the optimal minimal time paths are taken by the user to image the area. This ensures minimal time given wind conditions.

An aerial platform such as a tethered balloon is subject to translations and rotations in the air due to the impact of wind. The motion caused by wind makes the imagery collected by the imaging system difficult to interpret. To make sense out of subsequent images, the user is forced to constantly recalibrate his mental mapping between the image plane and the physical world. This makes the user-interface highly cumbersome and non-intuitive. Furthermore, it is difficult to use this data in machine learning algorithms as well as in processing of data. In an implementation, to account for this GCD 106 may realign images across time.

Figure 6:
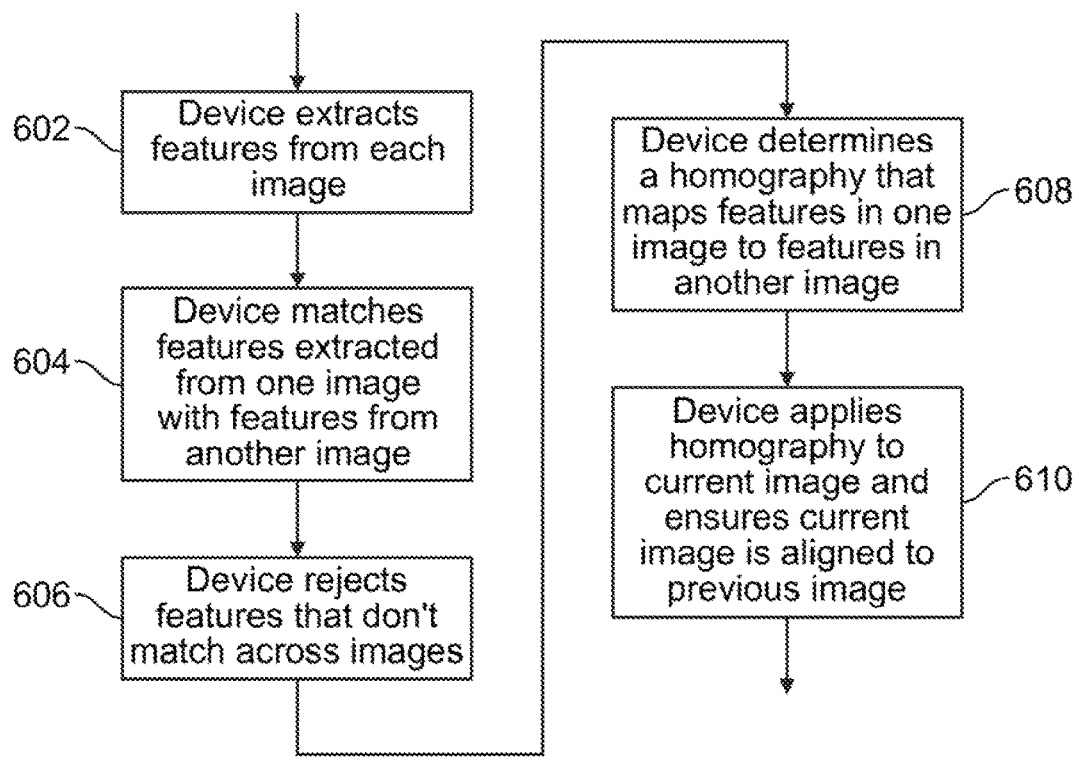
FIG. 6 is a flow diagram illustrating example operations for aligning images in a mobile device when imaging an region of interest.

FIG. 6 is a flow diagram illustrating example operations for aligning images in a device when imaging a region of interest. In an implementation, the operations of FIG. 6 may be performed by GCD 106 during the process of FIG. 3. The process of FIG. 6 may be used to align images taken in a narrow time-period to create a larger panorama. For example, the process may be used to align a burst of images or frames extracted from a short video clip. This provides a resultant image that may be presented to a user that covers a larger area than that captured by a single image. The process of FIG. 6 may also be used to align sets of images across time. For example, two sets of images, image set A (taken at time T1) and image set B (taken at time T2), may be taken. Then images in image sets A and B may be aligned so that a time-lapse of the panorama showing the transition from time T1-T2 may be provided. The time-lapse of the panorama allows a user to visualize how the terrain changed over a period of time and may give valuable insights to the user.

The process begins at 602 where GCD 106 extracts features from each image captured by camera device 104. At 604, GCD 106 matches features extracted from one image with another image. At 606 GCD rejects the features that do not match across images. At 608, GCD 106 determines a homography that maps features in one image to features in another image. At 610, GCD 106 applies the homography to the current image and ensures that the current image is aligned to the previous images. GCD 106 may perform the process of FIG. 6 as a pre-processing. As a result, the images generated by camera device 104 are aligned to each other by GCD 106. The images can then either be manually analyzed or fed into data processing algorithms to generate insights from the collected data. Using the collection of aerial data that may be acquired allows enablement of a wide variety of machine learning applications. For example, in an agriculture scenario such data can give insight about the rate of crop growth, the health of plants over the days, the movement of water in a field, and help with pest detection.

In an implementation, camera device 104 may comprise a gyro that transmits gyro readings as camera device 104 swings and pivots around various axis during traversal of the paths by a user. The gyro readings may be associated with each image or each frame of a video taken. The gyro readings may be used for frame rejection in the process of panorama construction and/or path planning. For example, the gyro readings may be used for long-term aerial monitoring in the process of panorama construction. The gyro readings may also be used for path planning when determining areas that remain unimaged and need to be imaged again. The gyro readings may indicate the images/times when the camera was tilted away from the ground plane. Then, based on the gyro readings, frames/images captured by the camera when it was tilted beyond an acceptable range may be discarded. The range of acceptable gyro readings may be a parameter that is input to the system. For example, a user may input the acceptable range of gyro readings into GCD 106 as part of the data entered at operation 302 of FIG. 3. A larger range of gyro values can add to stretch to the area of the panorama. A smaller range might allow fewer admissible images into the panorama generation pipeline but provide more accurate and/or better resolution images.

Figure 7:
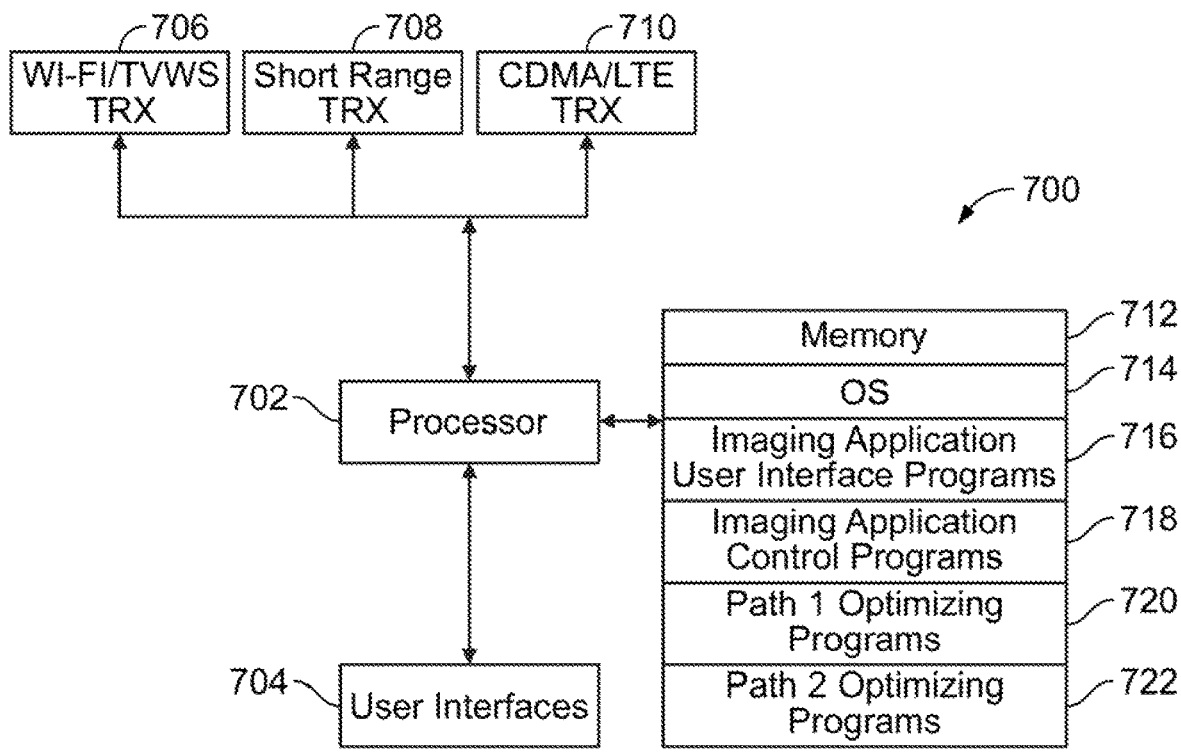
FIG. 7 illustrates an example mobile device for use in imaging an area of interest.

FIG. 7 is a simplified block diagram of an example device for use in imaging an area of interest. Device 700 may be implemented in network 100 to operate as GCD 106 according to FIG. 3, and FIGS. 5A and 5B. Device 700 represents a possible implementation of any device that may operate in a system, such as system 100, according to the embodiments of the disclosure. In an implementation, device 700 may be a smart phone or tablet device that may be easily carried by a user. Device 700 may include user interfaces (UIs) 704 which may include any type of interface, for example, a touch screen/keypad, microphone, speaker or camera which receive inputs and provide outputs to and from device 700. Device 700 includes processor 702 and memory 712 which is shown as including program code or instructions for imaging programs 716-722 that perform functions according to the embodiments. Processor 702 may comprise one or more processors, or other control circuitry or, any circuit or combination of processors and control circuitry that provide overall control of device 700 according to the disclosed embodiments. Memory 712 may be implemented as any type of computer readable storage media in device 700, including non-volatile and volatile memory. Memory 712 also includes OS programs 714 in the form of code for running the operating system to control the operations of device 700 and imaging programs 716-722. Memory 712 also may include data such as media data, camera photos and videos, contact data, calendar data, and other files used in the operation of applications on device 700. Processor 702 provides overall control of device 700 and the other functional blocks shown in FIG. 7 by executing instructions and code in memory 712 to implement communications with a camera device, such as camera device 104, and provide functions for operation in system 100.

In the example of FIG. 7, device 700 includes transceivers Wi-Fi/TVWS TRX 706, short range TRX 708, and CDMA/LTE TRX 710 that may each comprise one or more transceivers configured to operate in different example frequency bands. In the embodiments, device 700 and its transceivers may be operable to use one or more spectrum allocations that are allowed in each of the several frequency bands according to any relevant IEEE 802.11 or any other standard specifications to communicate wirelessly with camera device 104 and gateway node 108. In one implementation, Wi-Fi/TVWS TRX 706 may be configured to allow device 700 to communicate with camera device 104 using Wi-Fi Direct. Also, Wi-Fi/TVWS TRX 706 may use currently available TVWS channels according to requirements and regulations of the geographic area in which network 100 operates to communicate with gateway node 108. CDMA/LTE TRX 710 may also be configured to allow device 700 to communicate with gateway node 108 or cloud network 110 through a cellular system, such as an LTE system.

In an implementation, execution of imaging application user interface programs 716, imaging application control programs 718, path 1 optimizing programs 720, and path 2 optimizing programs 722 causes processor 702 to perform operations that cause device 700 to perform appropriate operations according to FIGS. 3, 5A-5B, and 6 in system 100.

The example embodiments disclosed herein may be described in the general context of processor-executable code or instructions stored on memory that may comprise one or more computer readable storage media (e.g., tangible non-transitory computer-readable storage media such as memory 712). As should be readily understood, the terms "computer-readable storage media" or "non-transitory computer-readable media" include the media for storing of data, code and program instructions, such as memory 712, and do not include portions of the media for storing transitory propagated or modulated data communication signals.

Figure 8A:
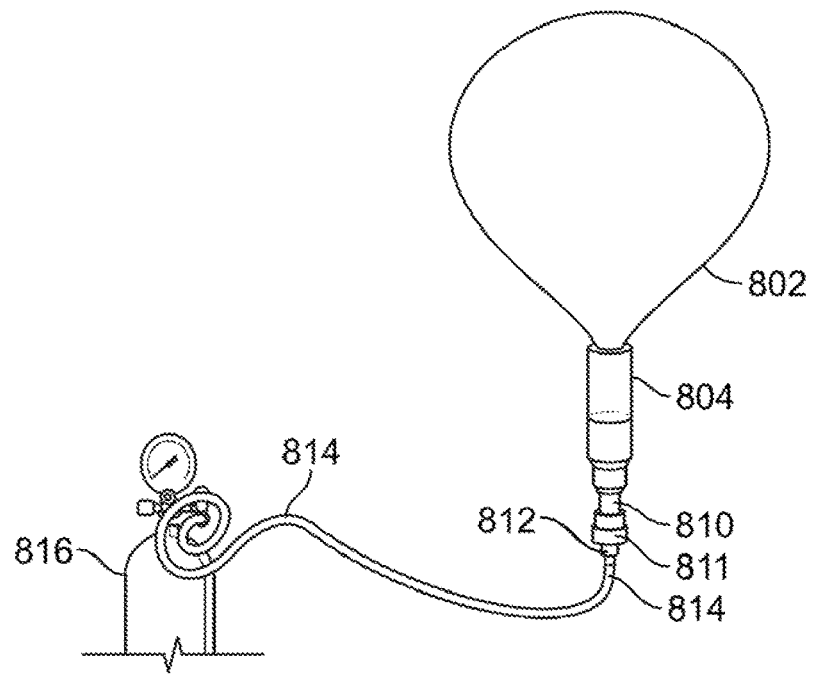
FIG. 8A is a diagram illustrating an example inflation system for a resealable and reusable balloon for an imaging system.
Figure 8B:
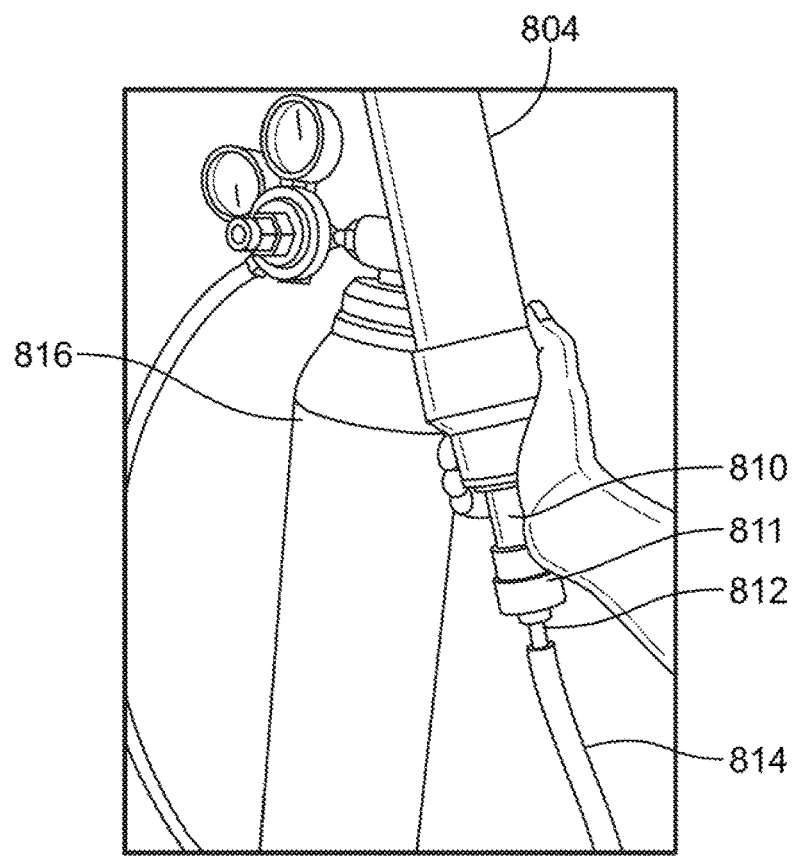
FIG. 8B illustrates example hardware of an inflation system for a balloon for an imaging system
Figure 8C:
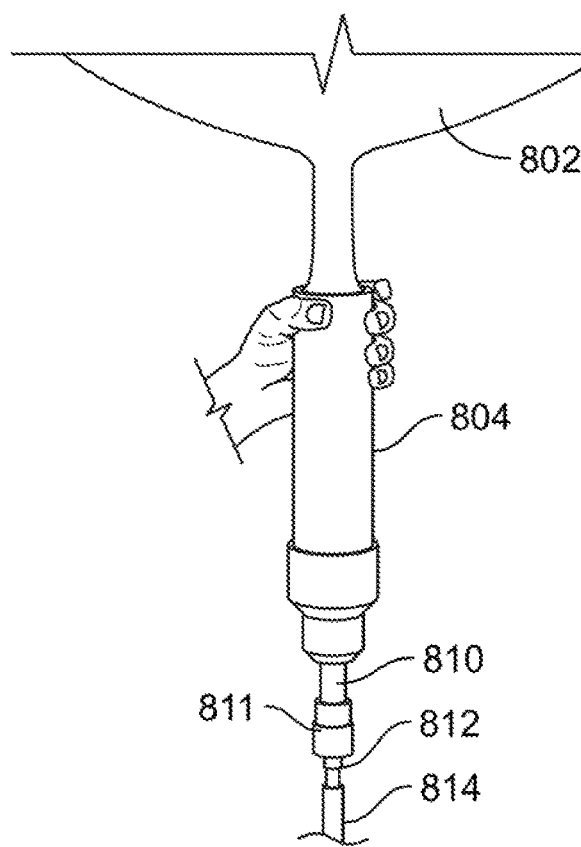
FIG. 8C illustrates use of example hardware of an inflation system for a balloon for an imaging system.

FIG. 8A is a diagram illustrating an example inflation system for a resealable and reusable balloon in an implementation of the imaging system 100 of FIG. 1. FIG. 8A shows balloon 802 attached to valve 804 having that has an end portion 810 including coupling fitting 811. Balloon 802 may be inflated with helium from tank 816 through hose 814, by attaching hose valve 812 to valve 804 at coupling fitting 811. FIG. 8B illustrates example hardware of an inflation system for a balloon for an imaging system. FIG. 8C illustrates use of example hardware of an inflation system for a balloon for an imaging system during inflation.

End portion 810 and coupling fitting 811 may be configured in valve 804 so that the valve 804 is resealable and reusable. This lowers the cost of the imaging system. Also, valve 804 serves as an attachment point for the camera device.

To lower cost of imaging system, the balloon(s) may be inflated to remain aloft and carry a camera device payload for a required period of time of use. In an implementation the imaging can use either be a single balloon or a multi balloon system. To lower cost of imaging system, the balloon(s) may be inflated to remain aloft and carry a camera device payload for a required period of time of use. The payload capacity of a balloon is dependent on several factors including pressure inside the balloon, temperature of the gas inside (as well as air temperature outside), and the volume of the balloon. The payload capacity of a balloon is a function of the volume as well as the temperature. There is also a very strong effect due to permeability of all membranes to helium. The payload capacity may be derived using Archimedes' principle. First, the number of moles of any gas inside a balloon of volume V at temperature T, and standard atmospheric pressure (101325 pascals) may be determined. The standard atmospheric is a reasonable pressure for the gas inside the balloon as the balloon surface dynamics would require it to be around the same as atmospheric pressure. Using the deal gas law, PV=nRT, the number of moles in a balloon with volume V and temperature T (in Kelvin) is $$n = \frac{V}{T} \times \frac{101325}{8.3144598} = 12186.6 \frac{V}{T} \text{moles}$$

We know from Archimedes' principle that the buoyant force experienced by a body immersed in a denser substance is equal to the weight it displaces. Thus we get that the weight displaced by a 'weightless' balloon. The weight displaced=n×(M(air)−M(He)) kg=n×(28.97−4.00)×10⁻³ kg=24.97×10⁻³ₙ kg. As the average molar mass of air is 28.97 grams per mole and the molar mass of helium is 4 grams per mole, the payload capacity of a helium filled balloon is $$\text{Payload} = 304.3 \frac{V}{T} \text{ kg.}$$

Thus a 6 ft diameter 'weightless' balloon should be able to carry 3.2 kg at room temperature of 300K. However, the actual capacity of a balloon is reduced because the weight of the balloon also needs to be lifted up from the buoyancy. If the weight of the balloon is $m_b$ kg, then the actual equation for payload capacity is, $$\text{Payload} = 304.3 \frac{V}{T} - m_b \text{ kg.}$$

The payload capacity of a balloon of volume V at temperature T calculated above uses the assumption that the balloon membrane is impermeable, i.e., no molecule can go into the balloon or come out of it. However, all materials have gaps where the size of the gaps depends on how closely the atoms are packed in the material. This means that molecules move from inside the balloon to outside and vice versa. Helium has the characteristic that it is the smallest molecule so it can leak through surfaces more rapidly than other gasses. The leakage leads to lowering of the number of moles in the balloon which results in a reduction in volume of the balloon which leads to loss of some buoyancy. In order to make the system to last long, it is essential to choose the balloon material appropriately. The polymer structure of latex facilitates movement of gas molecules. If a latex balloon is used, it may be chemically treated to reduce permeability. As an alternative, foil balloons can be used if there are no electrical poles in the vicinity. If the lift capacity of a balloon made of a particular material halves after X number of days, the balloon should be inflated in such a way that the initial lift generated by it is at least Y times the weight of the payload if we want the system to last for Z number of days. The values of X, Y, and Z, may be determined from experimentally derived data. Extending the longevity of the system from the balloon perspective lowers the cost of using and maintaining the imaging system.

Also, to reduce cost and increase efficiency of an imaging system it may be desirable to extend the operating time of the imaging system relative to a set amount of power, for example, the power available from a single battery charge. It may impractical to send power up to the camera on the balloon (though it can be done). However, this will require careful design of wires such that they are light-weight and also properly insulated. Improving the battery life of the camera device without wires is a more practical solution. In order to improve battery life it is useful to be able to determine the longevity of the camera device and allow certain camera device operating parameters to be adjusted.

Let the total amount of energy available (in joules) be denoted by $E_{total}$. This energy could be the energy stored in a standalone camera battery or a combination of the camera battery and another power source. Power consumption in different modes may be defined as follows: $P_{ph}$=Power used during while taking a photo; $P_v$=Power used during video recording; $P_{sl}$=Power used during sleep mode; $P_{on}$=Power used during startup and shut Down; and, $P_{tr}$=Power used for transferring media to the interface.

Note that sleep mode does not necessarily mean the camera device is completely powered off. Only the camera unit is shut down and background processes like a Wi-Fi unit (or other communication enabling technology) may be on. We consider the energy consumption during a single 'cycle.' In the cycle, the camera is switched on, a short video clip (or single image) is taken, the content is transferred to the interface/ground control device, and the camera unit is shutdown (put in sleep mode). This cycle is repeated until the battery is drained. Let the time to switch on and off be Ton, the time duration of a single video capture be $T_v$, the time to transfer the media be $T_{tr}$ and the sleep time be $T_{sl}$. The unit of time considered throughout is seconds. The total energy consumption during one 'cycle' (as defined earlier is):

$$E_{cycle}=2T_{on}P_{on}+T_vP_v+T_{tr}P_{tr}+T_{sl}P_{sl}$$

If one is interested in taking photographs instead of video, then formula would be have $T_{ph}$ (time to capture a photo/image) and $P_{ph}$ instead of the term corresponding to the videos. Additionally, the time to transfer the media would also vary accordingly when using photographs instead of videos. As the total cycle time is:

$$T_{cycle}=2T_{on}+T_v+T_{tr}+T_{sl}$$

The total number of cycles supported by the battery on a single charge is $E_{total}$. Thus, we get that the camera device lifetime is:

$$\text{Lifetime}=\frac{E_{total}}{E_{cycle}} \times T_{cycle}$$

Thus we see that the length of the video and the sleep time dictates how long the camera system lasts on a single charge.

In an implementation, CGD 106 of FIG. 1A may be configured to allow a user of the imaging system to enter various times for the parameters of the camera device that determine battery lifetime. For example, the number of cycles or sleep time $T_{sl}$ for capturing a video or photo per unit time may be entered by the user. The user may use more battery power (shorter lifetime) with a higher number of cycles per unit time. Alternately, the user may use less battery power (higher lifetime) with a lesser number of cycles per unit time. In another example, the user may be allowed to adjust $T_{ph}$ (time to capture a photo) or $T_v$ (time duration of a single video capture) to modify power usage.

In order for the imaging system to operate as efficiently as possible, it is desirable that the camera device be mounted on the aerial platform in a way that allows the camera device's field of vision to be as consistent as possible relative to the ground. As was described above, a tethered balloon or aerial platform is susceptible to translations and rotations in the air due to the impact of wind. Generally, given the path planning and image feature matching that may be performed by the imaging system, it would be desirable that the focal plane of the camera device remain as parallel to the ground as possible during imaging.

Figure 9A:
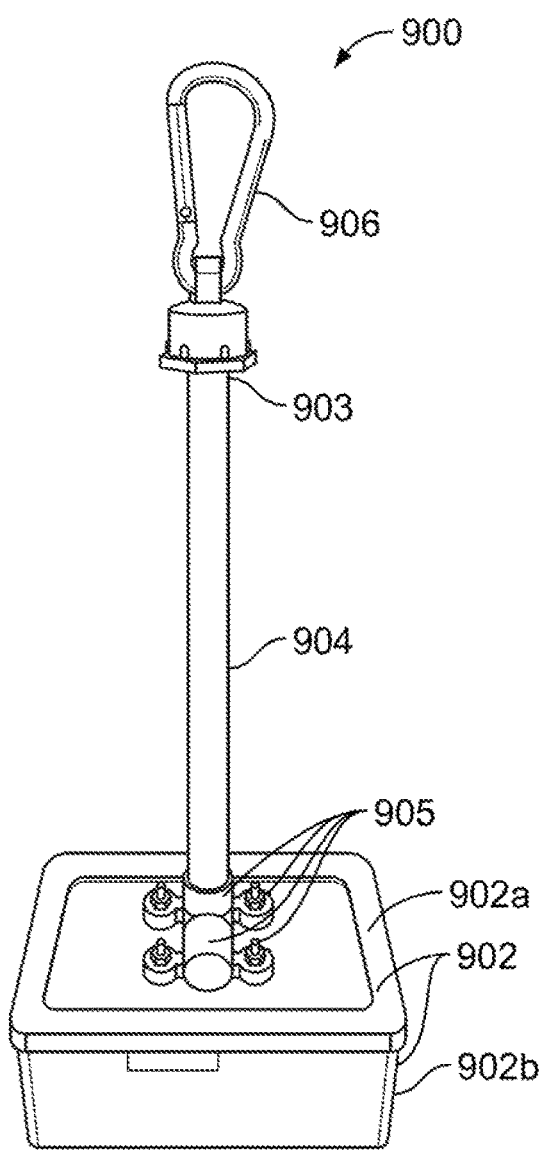
FIG. 9A illustrates an example camera device mount for an aerial imaging system.

FIG. 9A illustrates an example camera device mount for securing a camera device to an aerial platform such as a balloon in an aerial imaging system. Mount 900 includes an elongated member 904 having a first end 903 and a second end 905, and a long axis running from first end 903 to second end 905. Mount 900 also includes a swivel/coupling apparatus 906, which may comprise a hook, which couples the first end of member 904 to the aerial platform. For example, swivel/coupling apparatus 906 may be used to attach member 904 to a balloon by attaching the swivel/coupling apparatus 906 to valve 804 of FIG. 8. When attached to the aerial platform member 904 hangs along its long axis from the aerial platform and remains substantially perpendicular to the ground. Mount 900 also further comprises a case 902 having a first portion 902a and a second portion 902b.

Figure 9C:
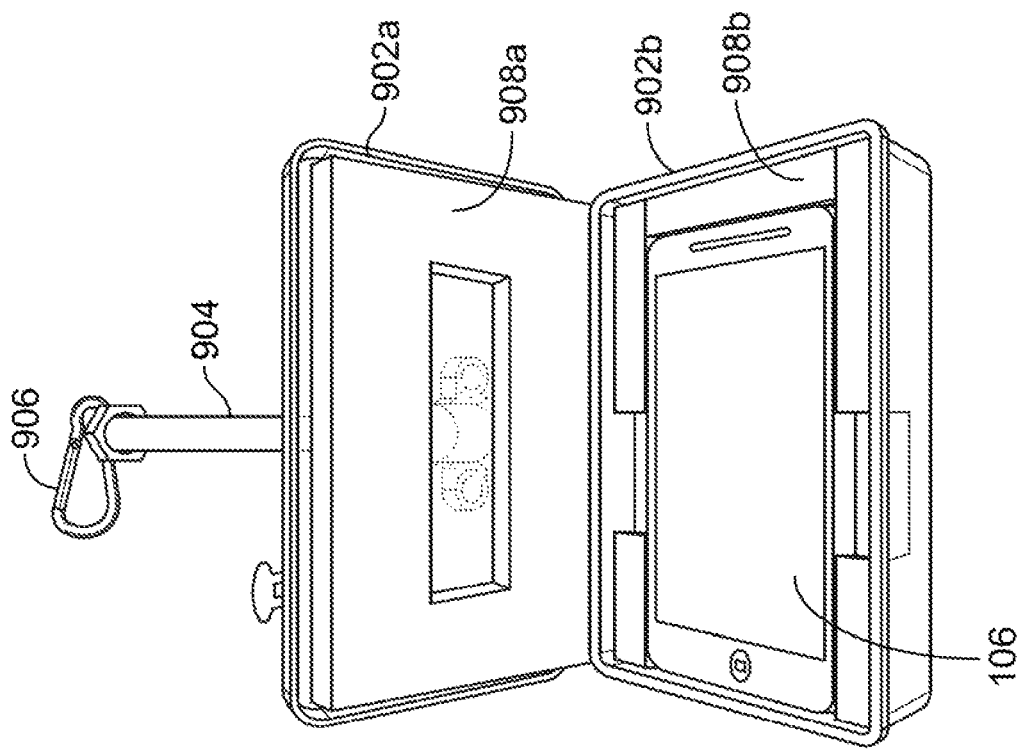
FIG. 9B illustrates a view of the example camera device mount when in an open position; and, FIG. 9C illustrates a view of the example camera device mount when a camera device is inserted in the camera device mount.
Figure 9B:
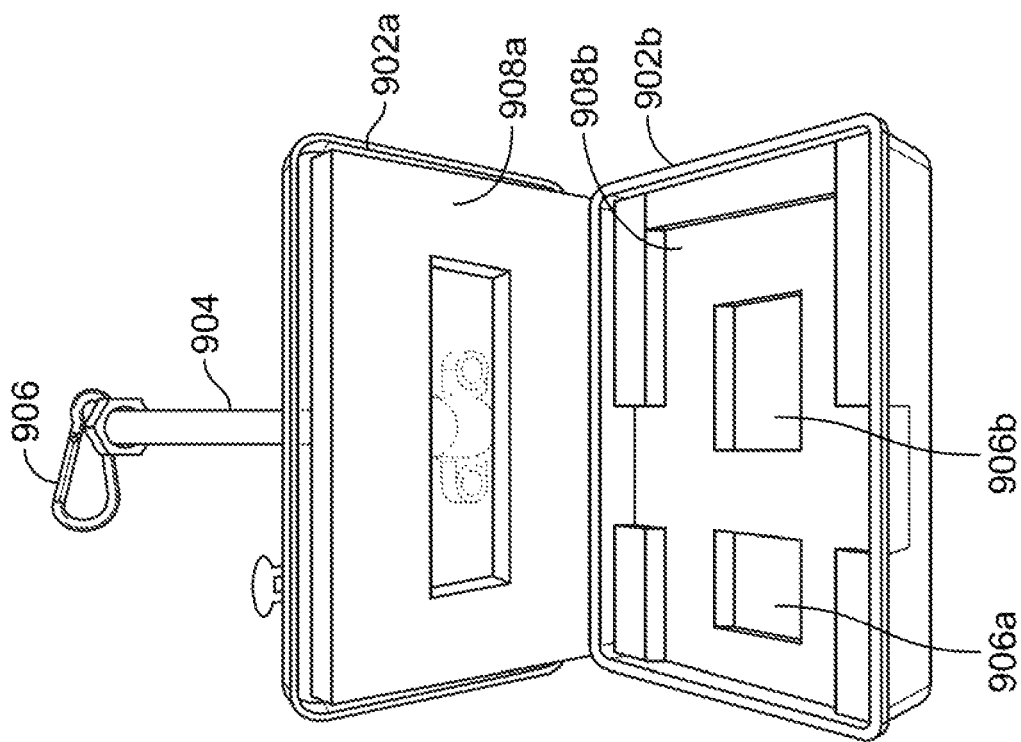

FIG. 9B illustrates a view of mount 900 when case 902 is in an open position. First portion 902a may form a cover and be rigidly attached to member 904 at second end 905. Second portion 902b may form a body of the case 902. Case 902 may be configured with recess 906a and recess 906b formed in material 908b of body 902b. Recesses 906a and 906b may be configured to receives and hold a camera device, for example a smartphone or a tablet device, that is used as the camera device 104 of the system of FIG. 1. FIG. 9C illustrates a view of the example mount 900 when a camera device 106 is inserted in the case 902. When closed around the camera device 106, first portion 902a and second portion 902b will hold the camera device's focal plane substantially perpendicular to the long axis of member 904. The mount 900 may then be attached beneath an aerial platform, such as a balloon using swivel/coupling apparatus 906. The mount will hang moveably with its long member 904 hanging from the aerial platform substantially perpendicular to the ground causing the focal plane of camera device, which is also held perpendicular to the long member 904 in case 902, to be substantially parallel to the ground.

While implementations have been disclosed and described as having functions implemented on particular wireless devices operating in a network, one or more of the described functions for the devices may be implemented on a different one of the devices than shown in the figures, or on different types of equipment operating in different systems.

The disclosed implementations include an apparatus comprising one or more processors and memory in communication with the one or more processors, the memory comprising code that, when executed, causes the one or more processors to control the apparatus to receive first data, the first data comprising information related to a region to be imaged and information related to a field of vision of a camera device positioned above a mobile entity on an aerial platform having a steering device, determine, based at least on the first data, a path within the region and provide information on the first path to the mobile entity, receive second data, the second data indicating a parameter related to power consumption by the camera device, and provide the second data to the camera device, receive third data from the camera device as the mobile entity moves the aerial platform along the first path using the steering apparatus, the third data including one or more images taken by the camera device according to the second data. The second data may include a length of time for capture of a still image. The second data may include a length of time for capture of a video. The second data may include a number of cycles per a time period for taking the one or more images. The apparatus may further comprise a mobile device including a user interface in communication with the one or more processors, and the code may further cause the one or more processors to control the mobile device to receive the second data from the user interface in response to the mobile entity entering input at the user interface. The code, when executed, further, may cause the one or more processors to control the apparatus to determine a battery life of the camera device based at least on the second data, and present an indication of the battery life at the user interface. The path may comprise a first path and the code, when executed, may further cause the one or more processors to control the apparatus to receive fourth data from the position sensor of the camera device as the mobile entity moves the aerial platform along the first path using the steering apparatus, determine, based at least on the fourth data, at least one unimaged area of the region that remains unimaged in the traverse of the first path, and, determine, based at least on the at least one unimaged area and the first data, a second path within the region and provide information on the second path to the mobile entity. The apparatus may further comprise a balloon, wherein the balloon provides the aerial platform on which the camera device is mounted, and the steering device may comprise a tether. The apparatus may further comprise a mobile device, wherein the mobile device includes the camera device, and the mobile device is mounted beneath the balloon.

The disclosed implementations also include an apparatus comprising one or more processors and memory in communication with the one or more processors, the memory comprising code that, when executed, causes the one or more processors to control the apparatus to receive first data, the first data comprising information related to a region to be imaged and information related to a field of vision of a camera device positioned on an aerial platform above the region, receive second data from the camera device during a time period, the second data including one or more images taken by the camera device, extract a plurality of features from the plurality of images, reject selected features of the plurality of features that do not match across the plurality of images, determine a homography that maps features in each image of the plurality of images to features in another image of the plurality of images, and apply the homography to a current image of the plurality of images, and align the current image to an previous image of the plurality of images taken previously to the current image. The aerial platform may include a steering device and the code, when executed, may further causes the one or more processors to control the apparatus to determine, based at least on the first data, a path within the region and provide information on the first path to the mobile entity, receive the second data from the camera device during a time period as the mobile entity moves the aerial platform along the first path using the steering apparatus. The plurality of images may comprise a series of images taken at discrete times over the time period and the second data may further include position data of the camera at the time of capture of each of the plurality of images. The plurality of images may comprise a video taken over the time period and the second data may further include position data of the camera at the time of capture of each frame of the video.

The second data may further include position data of the camera at the time of capture of each of the plurality of images. The apparatus may further comprise a mobile device including a user interface in communication with the one or more processors, and the code, when executed, may further cause the one or more processors to control the apparatus to display the current and previous images aligned at the user interface. The apparatus may further comprise a balloon, wherein the balloon provides the aerial platform on which the camera device is mounted, and the steering device may comprise a tether. The path may comprise a first path and the code, when executed, may further cause the one or more processors to control the apparatus to receive third data from the position sensor of the camera device as the mobile entity moves the aerial platform along the first path using the steering apparatus, determine, based at least on the third data, at least one unimaged area of the region that remains unimaged in the movement along the first path, and, determine, based at least on the at least one unimaged area and the first data, a second path within the region and provide information on the second path to the mobile entity.

The disclosed implementations also include a system comprising an aerial platform configured to rise to a height above ground and including a steering apparatus that allows an entity on the ground to move the aerial platform in a desired direction when the aerial platform is above ground, a mount including a member having a long axis, and a first end and a second end, a coupling apparatus that couples the first end of the member to the aerial platform, wherein the member hangs substantially perpendicular along its long axis to the ground from the aerial platform, a case having a first portion and a second portion, the first portion coupled to the second end of the member, wherein the case is configured to receive a camera device and, when the first portion and second portion are secured to hold the camera device, the focal plane of the camera device is held perpendicular to the long axis of the member. The aerial platform may comprise a balloon. The steering apparatus may comprise a tether. The coupling apparatus may comprise a hook. The camera device may comprise a smart phone.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLD s), etc. Use of the term processor or processing unit in this disclosure is meant to include all such implementations.

Also, although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus comprising:
one or more processors and,
memory in communication with the one or more processors, the memory comprising code that, when executed, causes the one or more processors to control the apparatus to:
receive first data, the first data comprising information related to a region to be imaged and information related to a field of vision of a camera device positioned on an aerial platform above the region;
receive second data from the camera device, the second data including a plurality of images taken by the camera device;
extract a plurality of features from the plurality of images;
reject selected features of the plurality of features that do not match across the plurality of images;
determine a homography that maps features in each image of the plurality of images to features in another image of the plurality of images; and,
apply the homography to a current image of the plurality of images and align the current image to a previous image of the plurality of images taken previously to the current image,
wherein the aerial platform includes a steering device and the code, when executed, further causes the one or more processors to control the apparatus to:
determine, based at least on the first data, a path within the region and provide information on the path to a mobile entity;
receive the second data from the camera device during a time period as the mobile entity moves the aerial platform along the path using the steering device,
wherein the path comprises a first path and the code, when executed, further causes the one or more processors to control the apparatus to:
receive third data from the position sensor of the camera device as the mobile entity moves the aerial platform along the first path using the steering device;
determine, based at least on the third data, at least one unimaged area of the region that remains unimaged in the movement along the first path; and,
determine, based at least on the at least one unimaged area and the first data, a second path within the region and provide information on the second path to the mobile entity.

2. The apparatus of claim 1, wherein the plurality of images comprises a series of images taken at discrete times over the time period and the second data further includes position data of the camera device at the time of capture of each of the series of images.

3. The apparatus of claim 1, wherein the plurality of images comprises a video taken over the time period and the second data further includes position data of the camera device at the time of capture of each frame of the video.

4. The apparatus of claim 1, wherein the apparatus further comprises a mobile device including a user interface in communication with the one or more processors, and the code, when executed, further causes the one or more processors to control the apparatus to display the current and previous images aligned at the user interface.

5. The apparatus of claim 1, further comprising a balloon, wherein the balloon provides the aerial platform on which the camera device is mounted, and the steering device comprises a tether.

6. A method comprising:
receiving first data, the first data comprising information related to a region to be imaged and information related to a field of vision of a camera device positioned on an aerial platform above the region;
receiving second data from the camera device, the second data including a plurality of images taken by the camera device;
extracting a plurality of features from the plurality of images;
rejecting selected features of the plurality of features that do not match across the plurality of images;
determining a homography that maps features in each image of the plurality of images to features in another image of the plurality of images;
applying the homography to a current image of the plurality of images and align the current image to a previous image of the plurality of images taken previously to the current image;
determining, based at least on the first data, a path within the region and providing information on the path to a mobile entity;
receiving the second data from the camera device during a time period as the mobile entity moves the aerial platform along the path using a steering device;
receiving third data from the position sensor of the camera device as the mobile entity moves the aerial platform along the path using the steering device;

determining, based at least on the third data, at least one unimaged area of the region that remains unimaged in the movement along the path; and determining, based at least on the at least one unimaged area and the first data, an additional path within the region and providing information on the additional path to the mobile entity.

7. The method of claim 6, wherein the plurality of images comprises a series of images taken at discrete times over the time period and the second data further includes position data of the camera device at the time of capture of each of the series of images.

8. The method of claim 6, wherein the plurality of images comprises a video taken over the time period and the second data further includes position data of the camera device at the time of capture of each frame of the video.

9. The method of claim 6, further comprising displaying the current and previous images aligned on a user interface of a mobile device.

10. The method of claim 6, wherein the aerial platform comprises a balloon to which the camera device is attached, and the steering device comprises a tether connected to the balloon.

11. A non-transitory computer-readable storage medium having stored thereon computer executable instructions, which when executed by a computer device, cause the computer device to:

receive first data, the first data comprising information related to a region to be imaged and information related to a field of vision of a camera device positioned on an aerial platform above the region;

receive second data from the camera device, the second data including a plurality of images taken by the camera device;

extract a plurality of features from the plurality of images;

reject selected features of the plurality of features that do not match across the plurality of images;

determine a homography that maps features in each image of the plurality of images to features in another image of the plurality of images;

apply the homography to a current image of the plurality of images and align the current image to a previous image of the plurality of images taken previously to the current image;

determine, based at least on the first data, a path within the region and provide information on the path to a mobile entity;

receive the second data from the camera device during a time period as the mobile entity moves the aerial platform along the path using the steering device;

receive third data from the position sensor of the camera device as the mobile entity moves the aerial platform along the path using the steering device;

determine, based at least on the third data, at least one unimaged area of the region that remains unimaged in the movement along the path; and determine, based at least on the at least one unimaged area and the first data, an additional path within the region and providing information on the additional path to the mobile entity.

12. The non-transitory computer-readable storage medium of claim 11, wherein the plurality of images comprises a series of images taken over the time period and the second data further includes position data of the camera device at the time of capture of each of the series of images.

13. The non-transitory computer-readable storage medium of claim 11, wherein the computer executable instructions, which when executed by the computer device, further cause the computer device to display the current and previous images aligned on a user interface of a mobile device.

14. The non-transitory computer-readable storage medium of claim 11, wherein the aerial platform comprises a balloon to which the camera device is attached, and the steering device comprises a tether connected to the balloon.

\* \* \* \* \*